Figure 1:
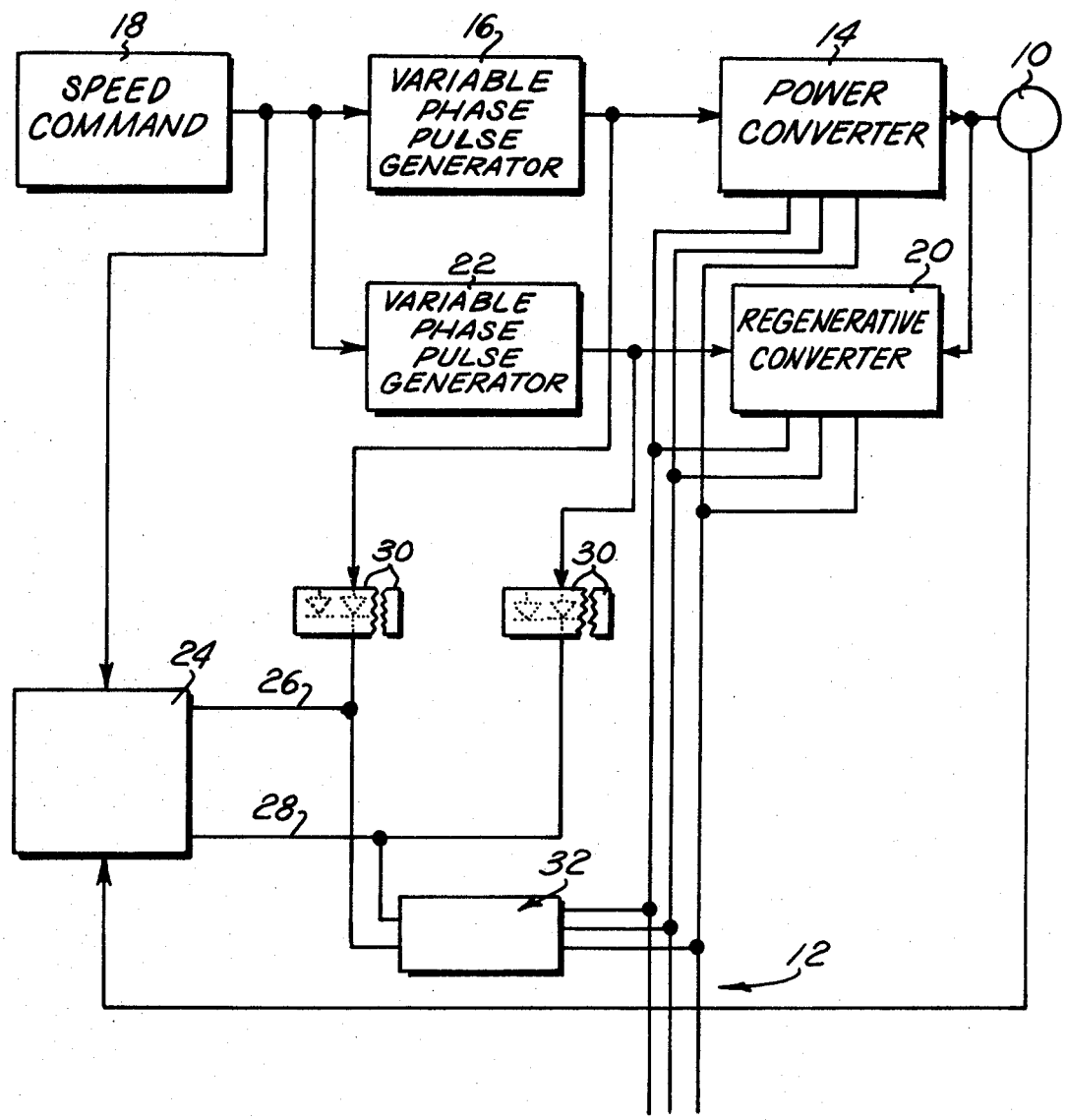

United States Patent [19]
Grygera

[11] 3,735,202
[45] May 22, 1973

[54] MOTOR CONTROL SYSTEM WITH POWER FAILURE PROTECTOR

[75] Inventor: James W. Grygera, Racine, Wis.
[73] Assignee: Eaton Corporation, Cleveland, Ohio
[22] Filed: July 26, 1971
[21] Appl. No.: 165,894

[52] U.S. Cl..................317/13 R, 307/215, 317/31, 321/14
[51] Int. Cl..............................................H02h 7/08
[58] Field of Search...............321/14; 317/31, 33 SC, 317/13 R; 307/215

[56] References Cited
UNITED STATES PATENTS 3,408,552  10/1968  Weber.................................321/14
3,636,434  1/1972  Beuk et al. ............................321/18

Primary Examiner—James D. Trammell
Attorney—Yount and Tarolli

[57] ABSTRACT

Motor control system in which a signal is derived indicating zero voltage on the line to the motor. The signal is applied to two inputs of logic means. One input resets itself with a time delay and if the other input still has the signal applied thereto the energizing circuit for the motor is inhibited.

21 Claims, 2 Drawing Figures

MOTOR CONTROL SYSTEM WITH POWER FAILURE PROTECTOR

The present invention relates to a motor control system with power failure protector.

The present invention relates to motor control systems and particularly to a motor control system in which loss of power is sensed and a control operation is performed.

In various types of motor control systems it is important to perform some type of control operation in the event that a power failure occurs. For example, in a motor control system where a regenerative power converter is gated each cycle of the voltage wave from an alternating current power source to return power from the motor, the reverse bias applied by the power voltage wave is relied upon to extinguish conduction in each cycle during the regenerative mode of operation. This occurs when the voltage wave becomes greater than the counter electromotive force of the motor. Consequently, if the system is a three phase system and there is a power failure across one phase, the conductive elements, normally SCRs, in the regenerative power converter, which are normally back-biased by that phase will not be reverse biased and will not be extinguished once gated on as long as the motor is running. Not only will this draw high current, but if the motor power converter is gated into operation, additional heavy currents may be drawn depending upon the reason for the loss of power on the single phase.

Accordingly, it is an object of the present invention to provide a new and improved motor control system in which the loss of power on the power line is sensed and a control operation performed to prevent the transmission of power between the motor and the power lines.

A further object of the present invention is to provide a new and improved motor control system in which transmission of power between the power lines and the motor is prevented when the loss of power at the power lines for a predetermined time is detected.

A still further object of the present invention is to provide in a motor control system a new and improved power loss detector which provides a first signal when the voltage of the source goes to zero and applies that signal directly to two inputs of logic means and is actuated if the signal is present at the logic means after a predetermined time.

Figure 2:
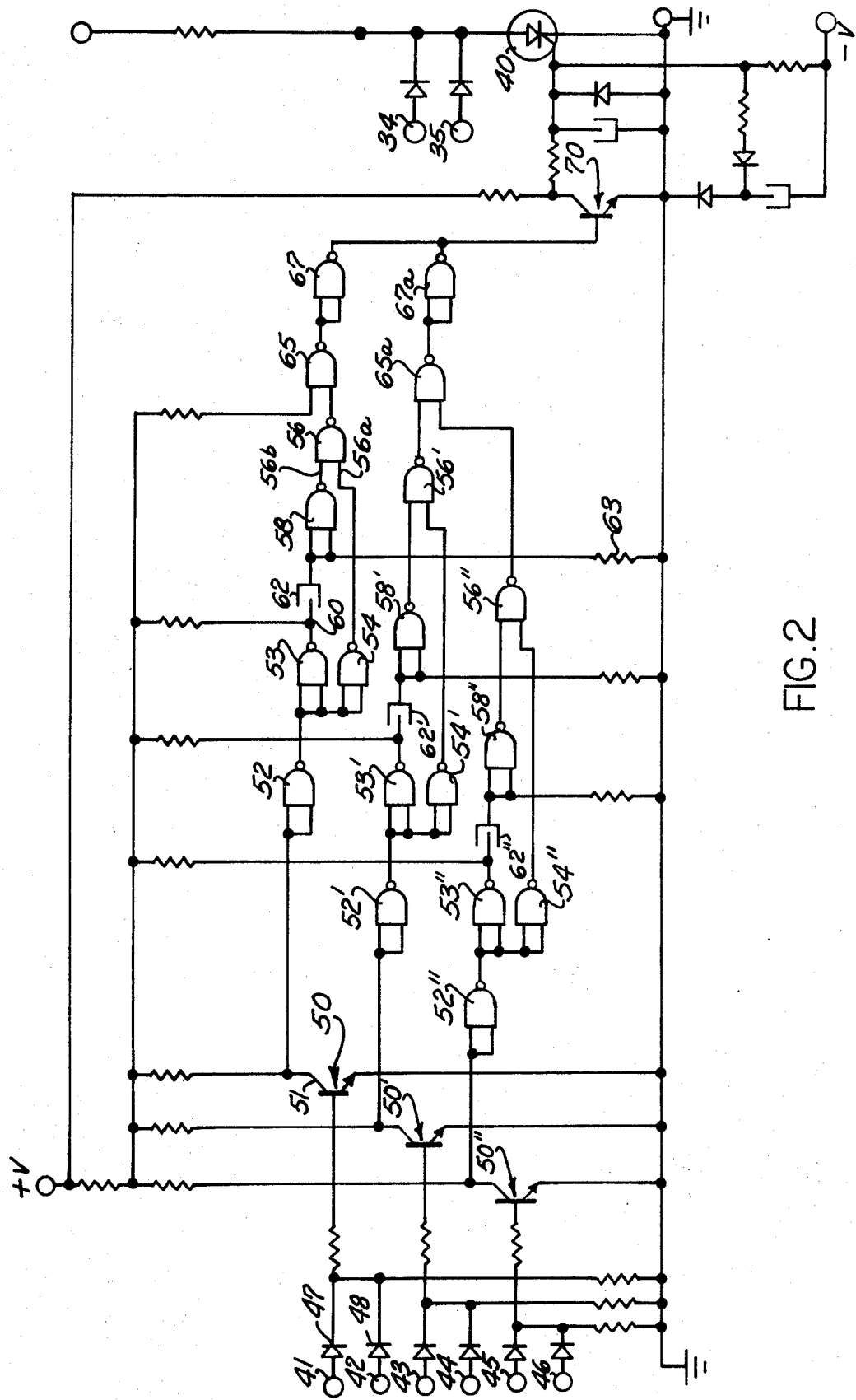

Further objects and advantages of the present invention will be apparent from the following detailed description thereof made with reference to the accompanying drawings forming a part of the present application for all subject matter disclosed therein and in which:

FIG. 1 is a schematic diagram of a motor control system embodying the present invention; and FIG. 2 is a more detailed circuit diagram of the portion of the system of FIG. 1 for sensing the power loss and performing a control operation.

The present invention is susceptible of use with various types of motor control systems but is particularly useful in a regenerative type motor control system such as disclosed in my co-pending applications, Ser. No. 165,983 and Ser. No. 165,469, filed concurrently herewith and assigned to the same assignee as the present invention and respectively entitled *Regenerative Motor Control System* and *Motor Control System*. The subject matter of those applications is incorporated herein by reference.

Referring to FIG. 1, a motor 10 which is to be controlled is a direct current motor which is energized from a three phase power source comprising power lines 12. The power lines are connected to the motor through a power converter 14. The power converter 14 is preferably a full-wave rectifier bridge of the SCR type with the SCRs being gated on each cycle of the power source when the current is to be conducted to the motor. The phase in the cycle that the SCRs of the power converter 14 are gated on is determined by a variable phase pulse generator 16 which produces gating pulses for the SCRs at a phase determined by a speed command signal derived from a speed command source 18. Conventionally, the phase of pulses is determined by the magnitude of the speed command signal.

In the system illustrated in FIG. 1, the motor is connected to the power lines when it is operating in a regenerative mode to return power to the power lines by a regenerative full-wave rectifier bridge 20. The full-wave regenerative rectifier bridge 20 is gated in each cycle by a variable phase pulse generator 22, the phases of the pulses from the phase generator 22 being determined by the magnitude of the speed command signal. To determine whether the motor is operating in a regenerative or motoring mode, the counter electromotive force of the armature is compared in a logic circuit 24 with the speed command signal to determine when the speed command signal is of such a magnitude that the phase of the gating pulse to the SCRs in the power converter 14 is such that the counter electromotive force of the motor will back-bias the SCRs in the power converter 14 and prevent conduction when the SCRs are gated at that phase. When this condition exists and the armature current becomes 0 the logic circuit 24, which also senses armature current, the pulses from the variable phase pulse generator to the power converter 14 are inhibited and the pulses from the variable phase pulse generator 22 to the regenerative power converter 20 are enabled to effect operation of the bridge 20. In the illustrated embodiment, the output of the variable phase pulse generators 16, 22 are respectively connected to inhibit lines 26, 28 through respective diode circuits 30 so that the pulses being transmitted are inhibited if the lines 26, 28 are at a low level and are enabled if the lines 26, 28 are at a high level. In operation, the circuit 24 will enable one of the power converters and disable the other. The circuit 24 may be as shown and described in detail in my copending application entitled Regenerative Motor Control System, filed concurrently herewith and assigned to the same assignee as the present invention.

In accordance with the present invention, a power loss circuit 32 detects the loss of power on any phase of the three-phase system 12 and applies an inhibit signal to the inhibit lines 26, 28 to prevent the transmission of pulses to either the power rectifying bridge 14 or the power rectifying bridge 20 in the event of the loss of power.

Referring to FIG. 2, the power loss circuit has an output terminal 34 and an output terminal 35 connected to the inhibit lines 26, 28, respectively. The output terminals 34, 35 will have a high level signal thereon which will enable the pulses to be transmitted between the variable phase pulse generators and the power converters, in the absence of low level signals on the lines by the circuit 24, as long as an SCR 40 is nonconductive. If the SCR 40 is rendered conductive, the signals at terminals 34, 35 will drop to a low level and this will inhibit the transmission of pulses to the power converters regardless of the signals applied to the inhibit lines 26, 28 by the logic circuit 24.

The power loss circuit 32 has input terminals 41, 42 connected across one phase of the three phase power supply 12, terminals 43, 44 connected across another phase, and terminals 45, 46 connected across the third phase.

The basic operation of the logic for each phase is substantially the same and the description will now proceed with the phase to which terminals 41, 42 are connected. The terminals 41, 42 are connected by diodes 47, 48 to the base of transistor 50 to provide full-wave rectification of the phase voltage to the base. When the alternating current voltage across the terminals 41, 42 is positive, the terminal 41 being positive relative to the terminal 42, the transistor 50 is rendered conductive to establish a low level or logic 0 at its collector 51. The low level of the collector 51 is applied to the inputs of an inverting NAND gate 52 whose output is applied to the inputs of an inverting NAND gate 53 and an inverting NAND gate 54. Consequently, the low level output on the collector 51 results in a logic 1 signal being applied to the inputs of the NAND gates 53, 54 to establish low level or logic 0 outputs on the outputs of the NAND gates 53, 54.

As the positive voltage lobe drops to zero, transistor 50 will be cut off to indicate that the voltage on the phase to which the terminals 41, 42 are connected has become zero. When this happens, the transistor 50 is cut off to provide a high level output at its collector to apply a logic 1 to the input of NAND gate 52. Accordingly, a logic 1 signal to the inputs of NAND gate 52 is a signal indicating that the voltage on the phase is zero. The application of a logic 1 to the inputs of NAND gate 52 changes its outputs to a logic 0 to change the outputs of NAND gates 53, 54 to logic 1's. The logic 1 from the NAND gate 54 is applied directly to one input 56a of a NAND gate 56 to condition the NAND gate to have a logic 0 output. The NAND gate 56 normally has a logic 1 on its input 56b so that unless input 56b is changed to a logic 0, the establishment of a logic 1 on the input 56a in response to the no-voltage signal will change the output of the NAND gate 56 from a logic 1 to a logic 0 when the output of NAND gate 54 changes from a logic 0 to a logic 1. This is, however, normally prevented by the operation of NAND gates 53, 58. Simultaneously with the change in the output of NAND gate 54 from a logic 0 to a logic 1 in response to a no-voltage logic 1 signal, the output of NAND gate 53 will switch from a logic 0 to a logic 1 to immediately establish a logic 1 at the inputs of the NAND gate 58. The output of the NAND gate 53 is connected to a junction 60 between a resistor connected to the positive side of the power supply and a condenser 62, the condenser 62 having its negative side connected to the inputs of the NAND gate 58 and to the negative side of the power supply by a resistor 63. When the output of NAND gate 53 switches to a logic 1, the negative side of the condenser 62 will immediately switch to a higher level to establish a logic 1 to the inputs of the NAND gate 58 to change its output from a logic 1 to a logic 0. Consequently, when the logic 1 signal from the transistor 50 effects the application of a logic 1 signal to the input 56a of NAND gate 56, it also effects, through the NAND gates 53 and 58, the change from a logic 1 to a logic 0 on the input 56b of the gate 56. Consequently, the output of NAND gate 56 remains a logic 1 and does not change.

If the alternating current lobe on the phase continues through zero, the transistor will be turned back on because of the full-wave rectifying diodes 47, 48 connected between the terminals 41, 42 and the base of transistor 50 to cause a loss of the no-voltage logic 1 signal at the transistor 50 to in turn cause the loss of the logic 1 signal at the output of gate 54 and on the input 56a of the gate 56. When the input 56a reverts to a logic 0, the output of gate 56 is clamped at a logic 1 regardless of the signal on the input 56b.

The signal on the input 56b will revert to a logic 1 when the condenser 62 is charged regardless of whether or not the output of NAND gate 53 is a logic 1 or is switched to a logic 0 as the voltage lobe on the phase becomes negative to provide a logic 0 output at the gate 53.

It can be seen that in the event of a power failure, the circuit will operate in the same way as the described zero crossing to provide a no-voltage signal on the phase to the NAND gate 52 in the form of a logic 1 signal. This logic 1 signal will immediately establish, through the NAND gate 54, a logic 1 on the input 56a of the NAND gate 56 and a logic 0, through the NAND gate 53 and the NAND gate 58, on the input 56b of the NAND gate 56. In the case of a power failure, the logic 1 signal to the NAND gate 52 will maintain a logic 1 input to the gate 56 on input 56a, but it will not maintain a logic 0 on the input 56b because the condenser 62 will charge to the higher level of the output of gate 53 and at that time the input to the NAND gate 58 will change from a logic 1 to a logic 0 since the inputs will assume the ground potential. Accordingly, it can be seen that the voltage across the phase is zero for longer than necessary to charge the condenser 62 to the higher level, the NAND gate 56 will have two logic 1's on its input and its output will shift to a logic 0.

The output of NAND gate 56 is applied to one input of a NAND gate 65 whose other input has a logic 1 maintained thereon. Consequently, when the output of the NAND gate 56 is a logic 1, the output of NAND gate 65 is a logic 0 which is inverted by a NAND gate 67 to provide a logic 1 at its output. When there is a logic 1 output at the NAND gate 67, a transistor 70 is rendered conductive. The transistor 70 is connected between the gate and the cathode of the SCR 40 and when it is conductive, the SCR 40 does not fire. Consequently, when the output of the gate 67 is a logic 1, as it is when there is voltage on the phase, the transistor 70 is conductive to maintain the SCR non-conductive which, in turn, maintains a high level signal at output terminals 34, 35 connected to the inhibit lines for the power converters. If, however, the output of NAND gate 56 changes to a logic 0 as it will in the case of a power failure for a greater length of time necessary than that required to charge the condenser 62, the output of NAND gate 56 will change from a logic 1 to a logic 0 to change the output of NAND gate 65 from a logic 0 to a logic 1 to in turn change the output of NAND gate 67 from a logic 1 to a logic 0 to cut off the transistor 70 and to establish a gate triggering voltage on the SCR 40. This will apply an inhibiting signal to the inhibit lines to prevent operation of the motoring or regenerating power converters and this will be maintained until the voltage is removed from across the anode and cathode of the SCR 40 to reset the circuit.

The phases to which the terminals 43, 44 and the terminals 45, 46 are connected have corresponding circuitry insofar as the transistor 50, the NAND gate 52, the NAND gates 53, 54, the condenser 62, and the NAND gate 58 are concerned. These components have been given the same reference numerals as the described components with respect to the phase to which terminals 41, 42 are connected except the components corresponding to the phase to which the terminals 43, 44 are connected have been given prime marks and the phase to which the terminal 45, 46 are connected have been given double prime marks. The outputs of the NAND gates 56' and the NAND gates 56'' for the other two phases are connected to a NAND gate 65a which functions in the same manner as the NAND gate 65 except that the NAND gate 65 has a fixed input while the NAND gate 65a has one input from the NAND gate 56' and one input from the NAND gate 56''. Accordingly, since the output of NAND gates 56', 56'' are normally logic 1's unless there is a power failure, at which time they switch to a logic 0, the output of NAND gate 65a is normally a logic 0. This will, however, shift to a logic 1 if power is lost on either phase to change either input to the NAND gate 65a to a logic 0. The logic 1 output is then inverted by a NAND gate 67a to establish a low level signal at the output of gate 67a which is connected to the base of transistor 70 to render the latter non-conductive to fire the SCR 40 to provide a low level inhibit signal at the terminals 34, 35. It can be seen that the gates 67, 67a are connected so that if either gate goes to a low level, the transistor 70 will be turned off to trigger the SCR 40 and provide a low level inhibit signal on the output terminal 34, 35.

From the foregoing, it can be seen that when the voltage on a phase crosses zero or fails, a no-power signal appears at the collector of transistor 50, 50', 50'' depending on the phase. The establishment of the no-power signal activates means, e.g. gates 53, 58 and condenser 62, to provide a pulse signal of a predetermined time duration and logic means, e.g. gate 65, which has inputs which change with the pulse signal and the no-power signal is activated to prevent conduction of current between the motor and power lines if the no-power signal is present and the pulse signal absent.

What is claimed is:

1. In a motor control system, a cyclical power source having a voltage which is periodically zero, a motor, power circuit means for connecting said motor and said source to transmit current therebetween, and circuit means for preventing transfer of current between said motor and said source in response to a failure of power in said power circuit comprising signal means for sensing a condition in said circuit indicative of power from said source and responsive to the sensing of the absence of power from the source for providing a no-power signal while the power is absent and control means connected to receive said signal and responsive to said no-power signal for preventing conduction of current between said motor and source when power is lost from said source.

2. In a motor control system as defined in claim 1 wherein said control means comprises first means actuated from a first state to a second state for a predetermined time in response to the establishment of said no-power signal, and second means actuated to prevent conduction of said current in response to the existence of said no-power signal and said first state of said first means.

3. In a motor control system as defined in claim 1 wherein said source is a poly-phase A.C. source and said circuit means comprises a rectifying bridge means including controllable rectifiers to be back-biased by said source to periodically turn off the rectifiers for conducting current between said source and said motor and pulse generating means for generating pulses to gate said bridge into conduction during a half-cycle of said A.C. source, and said signal means comprises means for sensing a condition indicative of the voltage on the phases of said poly-phase source to provide said no-power signal in the absence of a voltage on any of said phases.

4. In a motor control system as defined in claim 3 wherein said control means comprises means for inhibiting the transmission of pulses from said pulse generating means to said rectifying means.

5. In a motor control system as defined in claim 3 wherein said bridge means includes a regenerative bridge for conducting current from said motor to said source.

6. In a motor control system as defined in claim 5 wherein said control means comprises means for inhibiting the transmission of pulses from said pulse generating means to said bridge means.

7. In a motor control system as defined in claim 1 wherein said source is an A.C. source and said signal means is responsive to the voltage of said source being substantially zero and said control means is actuated in response to said control signal being zero for a predetermined time to prevent conduction of current by said bridge while the condition exists.

8. In a motor control system as defined in claim 1 wherein said source is a poly-phase source and said signal means is responsive to loss of power on any phase to provide said no-power signal and said control means comprises means for preventing conduction of power on the other phases of the system while power is lost on any phase.

9. A motor control circuit as defined in claim 1 wherein said circuit means comprises a silicon-controlled rectifier means.

10. A motor control circuit as defined in claim 3 wherein said circuit means comprises a silicon-controlled rectifier means.

11. A motor control circuit as defined in claim 10 wherein said circuit means comprises a motoring bridge and a regenerative bridge for conducting current between said motor and said source.

12. In a motor control system as defined in claim 3 wherein said control means comprises first means responsive to the establishment of said no-power signal to provide a pulse signal of predetermined time duration, and second means having one input connected to receive said pulse signal and another input which has a predetermined signal applied thereto while said no-power signal exists and a different signal applied thereto when it does not exist, said second means being actuated to prevent conduction of current by said bridge means in response to the absence of a pulse on said one input and the existence of said predetermined signal on said another input.

13. In a motor control system as defined in claim 8 wherein said control means comprises first means responsive to the establishment of said no-power signal to provide a pulse signal of predetermined time duration, and second means having one input connected to receive said pulse signal and another input which has a predetermined signal applied thereto while said no-power signal exists and a different signal applied thereto when it does not exist, said second means being actuated to prevent conduction of current by said bridge means in response to the absence of a pulse on said one input and the existence of said predetermined signal on said another input.

14. In a motor control system, a power source, a motor, power circuit means for connecting said motor and said source to transmit power therebetween, and means for preventing transfer of power between said motor and said source in response to a failure of power from said source comprising signal means responsive to the absence of power for providing a no-power signal while the power is absent and control means responsive to the existence of said signal for a predetermined time for preventing conduction of current between said motor and power source, said control means comprising first means responsive to the establishment of said no-power signal to provide a pulse signal of predetermined time duration, and second means having one input connected to receive said pulse signal and another input which has a predetermined signal applied thereto while said no-power signal exists and a different signal applied thereto when it does not exist, said second means being actuated to prevent conduction of current between said source and motor in response to the absence of a pulse on said one input and the existence of said predetermined signal on said another input.

15. In a motor control system as defined in claim 10 wherein said source is an alternating current source and said signal means is responsive to the voltage of said source being substantially zero, and said no-power signal provides said pulse signal as the voltage of said source changes polarity.

16. In a motor control system, a power source, a motor, power circuit means for connecting said motor and said source to transmit power therebetween, and means for preventing transfer of power between said motor and said source in response to a failure of power from said source comprising signal means responsive to the absence of power for providing a no-power signal while the power is absent and control means responsive to the existence of said signal for a predetermined time for preventing conduction of current between said motor and power source, said source being an alternating current source and said signal means being responsive to the voltage of said source being substantially zero, said no-power signal being a pulse output as the voltage of said source changes polarity.

17. In a motor control system, an alternating current power source, first controllable rectifying bridge means for conducting current in one direction from said source to a motor, second controllable rectifying bridge means conducting current in a second direction from said load to said source, said first and second bridge means comprising controllable rectifiers periodically back-biased by said source to turn off the rectifiers and signal means for sensing a condition indicating a failure of power from said source and for providing a no-power signal in response to such failure, and control means responsive to said no-power signal for inhibiting operation of at least one of said bridge means to conduct current upon a loss of power from said source to said bridge means.

18. In a motor control system as defined in claim 17 wherein said source is a polyphase source and said sensing means senses a loss of power on any phase to provide said no-power signal.

19. In a control system as defined in claim 18 wherein said control means comprises means for distinguishing between a change in electrical polarity on a phase and a loss of power on a phase to preclude inhibiting of said bridge means in response to a change of electrical polarity.

20. In a control system as defined in claim 1 wherein said power source is a polyphase A.C. source and said control means comprises means for distinguishing between a loss of power on a phase and a change of polarity on a phase, and said bridge means being motoring and regenerative bridges respectively.

21. A method of controlling the firing of silicon-controlled rectifiers in controllable bridges connected across a polyphase A.C. power supply for conducting current in respective opposite directions between a motor and the source, electrically monitoring the power supply to determine whether the power source has failed to where it is not capable of back-biasing controlled rectifiers in the bridges, establishing an electrical signal indicating such a failure of the power source, and using said signal to actuate control circuitry for rendering said bridges ineffective to conduct current while said failure exists.

* * * * *